United States Patent [19]

van der Schoot

[11] Patent Number: 5,007,785

[45] Date of Patent: * Apr. 16, 1991

[54] METHOD AND APPARATUS FOR UNLOADING STACKS OF TRAYS

[75] Inventor: Jelle van der Schoot, Aalten, Netherlands

[73] Assignee: Staalkat B. V., Aalten, Netherlands

[*] Notice: The portion of the term of this patent subsequent to Apr. 17, 2007 has been disclaimed.

[21] Appl. No.: 435,968

[22] Filed: Nov. 14, 1989

Related U.S. Application Data

[63] Continuation-in-part of Ser. No. 270,590, Nov. 14, 1988, Pat. No. 4,917,559.

[51] Int. Cl.$^5$ .................. B65G 59/02; B65G 67/24
[52] U.S. Cl. .................... 414/331; 414/392; 414/401; 414/796.6
[58] Field of Search ........ 414/331, 373, 375, 389–392, 414/394, 396, 399, 401, 416, 626, 225, 786, 795.6, 796, 796.2, 796.3, 796.6, 277, 281, 282, 286; 901/16

[56] References Cited

U.S. PATENT DOCUMENTS

| | | | |
|---|---|---|---|
| 2,535,961 | 12/1950 | Schutt | 414/286 X |
| 3,075,656 | 1/1963 | Pearne | 414/391 X |
| 3,637,095 | 1/1972 | Kampfer | 414/373 X |
| 3,884,363 | 5/1975 | Ajlouny | 364/478 X |
| 4,597,707 | 7/1986 | Cornacchia | 901/16 X |
| 4,634,333 | 1/1987 | Butterly, Jr. et al. | 414/331 |

FOREIGN PATENT DOCUMENTS

| | | | |
|---|---|---|---|
| 2020267 | 11/1971 | Fed. Rep. of Germany | 414/796.6 |
| 2562523 | 10/1985 | France | 414/331 |
| 2587692 | 3/1987 | France | 414/626 |
| 63-71031 | 3/1988 | Japan | 414/626 |
| 616514 | 7/1978 | U.S.S.R. | 414/172 |
| 755895 | 8/1956 | United Kingdom | 414/417 |
| 903440 | 8/1962 | United Kingdom | 414/631 |
| 2106070 | 4/1983 | United Kingdom | 414/331 |

Primary Examiner—Robert J. Spar
Assistant Examiner—Robert S. Katz
Attorney, Agent, or Firm—Griffin, Branigan & Butler

[57] ABSTRACT

An apparatus for unloading a container having different shelves, each filled with a plurality of stacks of trays filled with a product, such as eggs. The container is comprised of four vertical support sections and horizontal connecting sections which support the stack carrying shelves. During the unloading of the various shelves, each of which carries at least three adjacent stacks of trays, the middle stack is, preferably, first removed, and more preferably after loosening such middle stack by lifting and moving it sideways a small distance to prevent jamming of the middle stack and an adjacent stack. In one embodiment, a fork-shaped unloading device can be inserted under tunnel-shaped openings of the lowermost of a stack of trays, and the points of which are provided with switch elements or sensors.

12 Claims, 4 Drawing Sheets

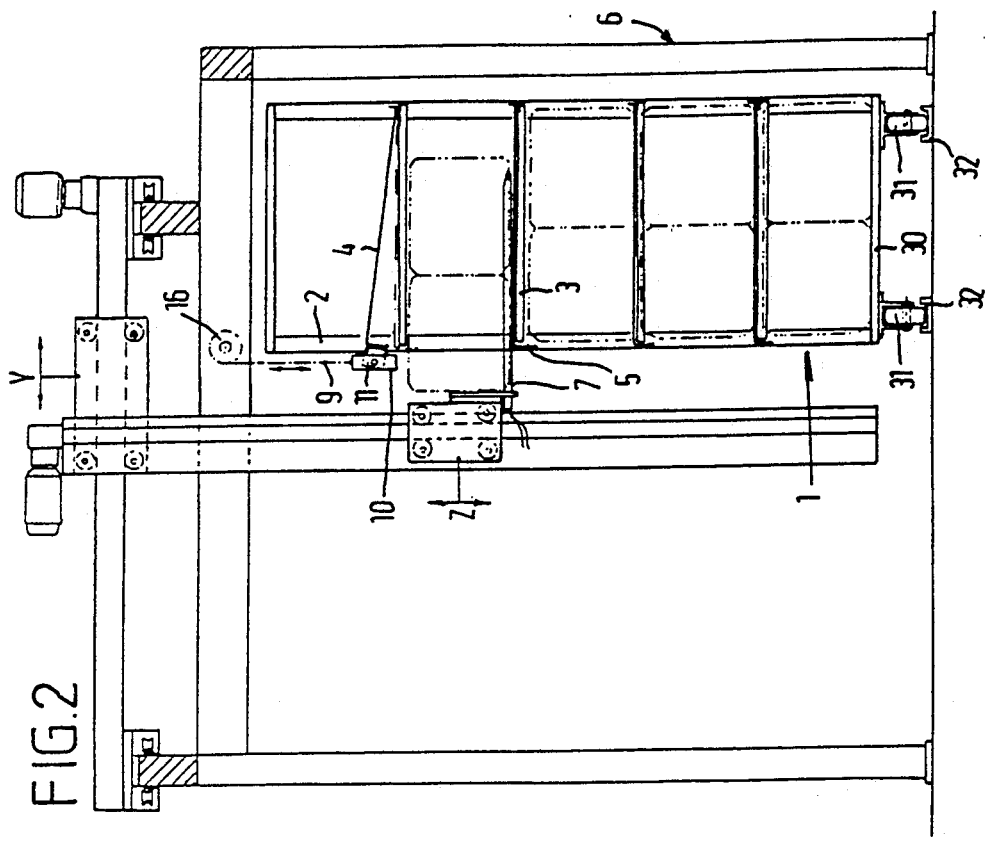
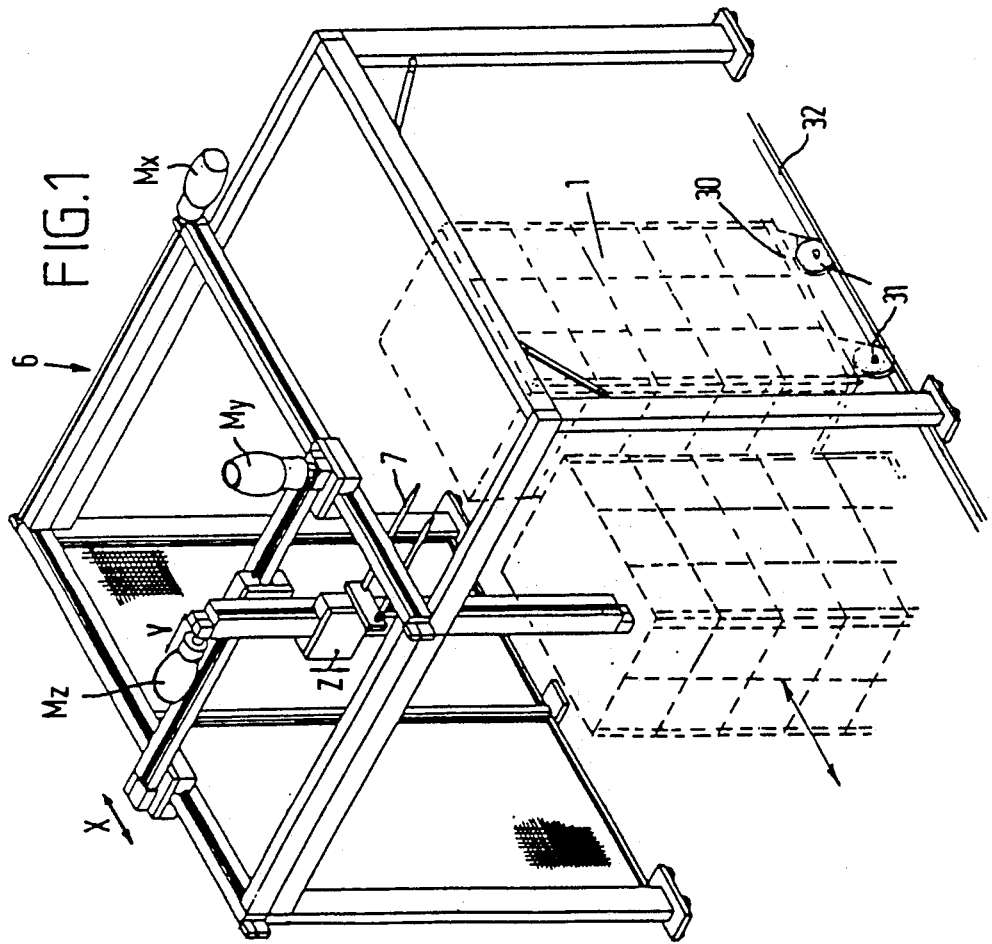

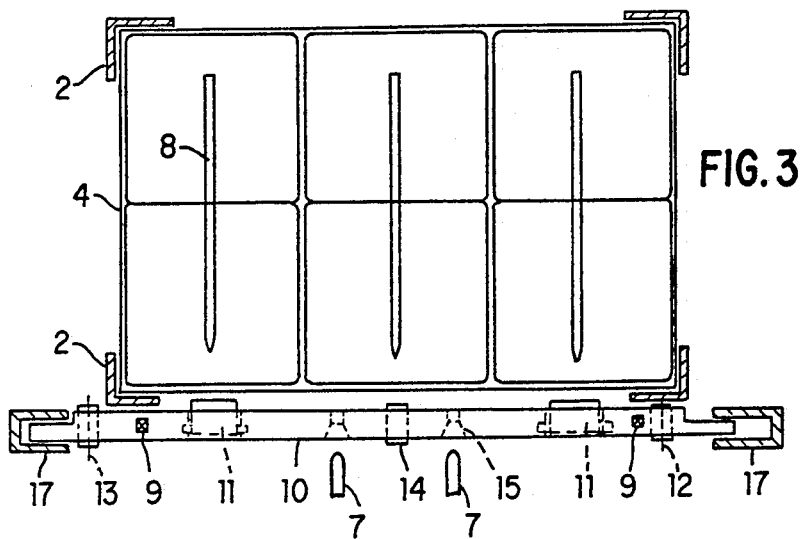
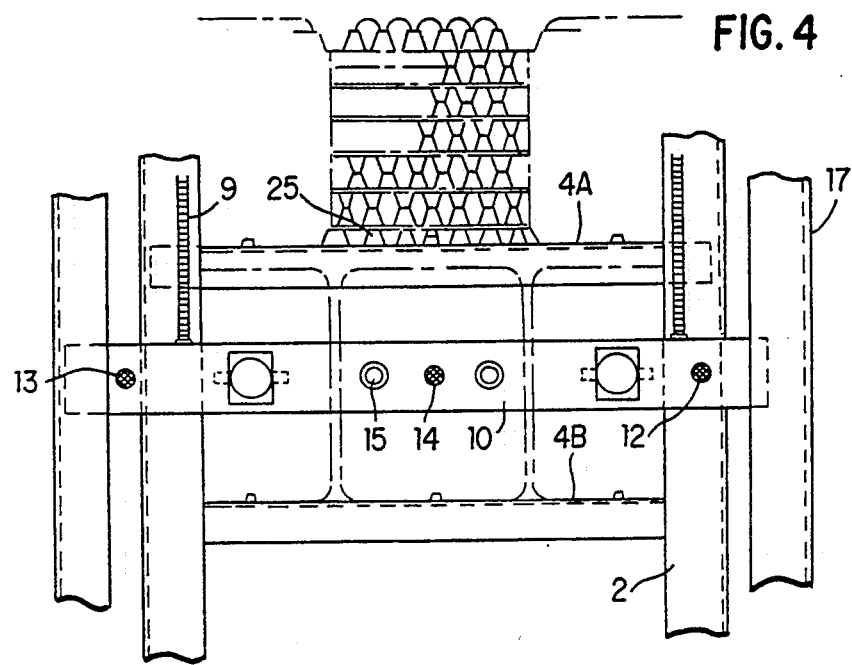
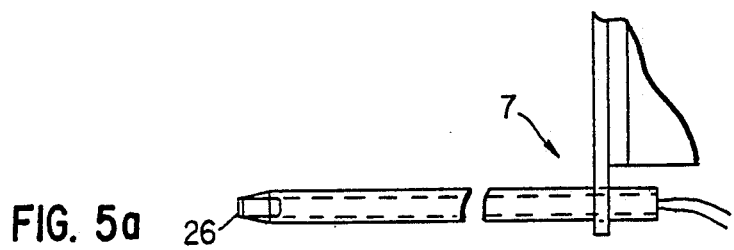
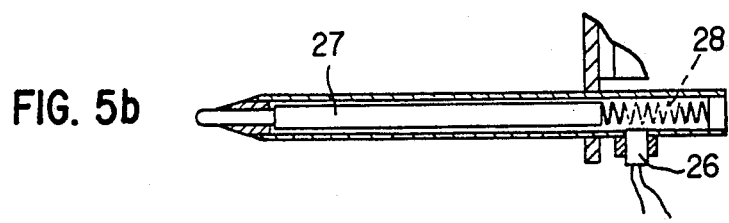

METHOD AND APPARATUS FOR UNLOADING STACKS OF TRAYS

This application is a continuation-in-part of copending U.S. application Ser. No. 270,590, filed on Nov. 14, 1988.

This invention relates to a method and apparatus for unloading a container having different vertically-disposed shelves or floor levels, each of which shelves is filled with a plurality of individual stacks of filled trays, e.g. filled with eggs and the like. The stacks of trays are disposed in a side-by-side relationship on the shelves. The container is essentially comprised of four vertical sections and a plurality of horizontally-disposed connecting sections which carry the shelves.

A method and apparatus of the present nature are described in Netherlands patent application no. 81,04384 and in the corresponding British patent 2,106,070. In that prior arrangement, a plurality of side-by-side stacks of trays are laterally moved from a shelf of the container to a movable discharge belt by means of a fixed positioned pushing member which pushes the stacks from the back side of the shelves to the front side of the shelves and onto the discharge belt disposed at the front side of the shelves. The container is moved vertically to register a shelf to be unloaded opposite the pushing member and the discharge belt. In that prior device, the shelves are in the form of stack carrying plates having a down turned or bent front edge to reinforce the front of these plates. In order that a stack may not be damaged by this front edge of such a plate by means of the pushing member, the superadjacent plate, i.e. the plate located above the plate being unloaded, must first be moved upwards, e.g. pivoted so that the front edge moves upwardly, since otherwise the down turned front edge of the next above superadjacent plate could interfere with the unloading of trays from the next under subadjacent plate.

That prior arrangement is unsatisfactory since the required modifications on the container demand new containers without angle iron vertical sections, which are normally used. This means a high investment. This because the pushing member would push the outer stacks against these sections. Further, the required vertical movement of the container necessitates an expensive lift which must be very accurately controlled to register a shelf with the pushing member and the discharge belt. Besides this the container lifting and lowering movement demands too much time, which causes a low capacity of the total system.

It is an object of the present invention to provide an improved method and apparatus with respect to the prior method and apparatus.

It has now been found that an unloading method and apparatus, of the nature described above, can be very substantially improved by arranging the unloading such that a stack of trays is not pushed from a shelf, as in the above-discussed prior Dutch patent application, but is slightly lifted and removed from the front of a shelf by an unloading means which is insertable under the stack of trays. Further, instead of moving the container vertically to register with the fixed positioned pushing member, the present unloading means operates with a container which is stationary during the unloading, and the unloading means is moved vertically along the container to the appropriate shelf for unloading.

This approach, however, does also engender some further steps and apparatus not associated with the prior method and apparatus, as discussed above, and further requires control means for controlling the unloading means. Also, while the present storage container is movable, i.e. may be moved around the factory floor from station to station, such as in tracks and the like, the present container is not vertically moved by a lift means during unloading, such as required by the above-discussed prior art.

In regard to the method aspect of the present invention, the method is that of unloading stacks of trays from a movable storage container, which container has vertically-disposed supports and a plurality of horizontally-disposed sections connecting those supports and forming a plurality of horizontally-disposed shelves having a front side and which shelves are positioned at different vertical levels of the container for holding on each shelf at least three laterally adjacent stacks of trays. In this aspect, the present storage container is similar to the storage container of the above-discussed prior art.

However, the present method departs from the method of the above-discussed prior art in that an unloading means is moved to the top of the front side of a first shelf to be unloaded and then horizontally inserted under a lowermost tray of the middle stack of trays of at least three laterally adjacent stacks of trays. The unloading means is then controllable so as to elevate and to move that middle stack of trays sufficiently laterally to loosen the middle stack of trays from the laterally adjacent stacks of trays, so that during subsequent unloading of that middle stack of trays, the middle stack of trays is removable without interference from the adjacent stacks of trays.

After such loosening of the middle stack of trays, the middle stack of trays is horizontally removed from the front side of the shelf of the container by the moving means.

In respect to the apparatus of the invention for unloading stacks of trays from the storage container, as defined above, again, the storage container has vertically-disposed supports and a plurality of horizontally-disposed sections connecting those supports and forming a plurality of horizontally-disposed shelves that are positoned at different vertical levels of the container for holding on each shelf at least three laterally adjacent stacks of trays, In this regard, again, the storage container is similar to that of the prior art described above.

However, in the present apparatus, the unloading means for unloading a stack of trays from the container has a configuration such that the unloading means is capable of being inserted under a lowermost tray of the middle stack of trays of the at least three laterally adjacent stacks of trays and supporting that middle stack of trays. Associated with the unloading means is a moving means for moving the unloading means, and a control means is associated with the moving means for controlling the movement of the unloading means such that the unloading means is movable in the following manner:

(a) vertically adjacent the container such as to place the unloading means at the top of a first shelf to be unloaded;

(b) horizontally forward (toward the middle stack of trays) such as to insert the unloading means under the lowermost tray of the middle stack of trays;

(c) vertically to slightly elevate the middle stack of trays from the shelf (for easy removal of the stack of trays from the shelf);

(d) laterally such as to loosen the middle stack of trays from laterally adjacent stacks of trays so that the middle stack of trays is removable without interference from the other stacks of trays of the three adjacent stacks of trays; and (e) horizontally backwards (in the opposite direction from that of the insertion movement) such as to remove the middle stack of trays from the container.

In one embodiment of the present invention, the unloading means is a fork-shaped element having at least two forks which can be inserted in the conventional tunnel-shaped openings of the lowermost tray of a stack of trays, and the ends thereof are provided with switch elements or sensors to sense when the forks are positioned at the top edge of a shelf to be unloaded. These sensors can cooperate with vertical sensing means, described hereinafter, so as to determine the varying heights of the shelves in the container.

In a further embodiment of the present invention, the width and possible oblique positioning of a shelf or the container are determined by an auxiliary sensing means provided with switch elements or sensors, which auxiliary sensing means is temporarily coupled with and cooperates with the unloading means, e.g. the fork. The auxiliary sensing means can also be used independently of the unloading means to raise a superadjacent shelf to facilitate the unloading of a subadjacent shelf. Such raising of a superadjacent shelf can be effected by magnetically engaging means, e.g. electromagnets in the auxiliary sensing means.

In a further embodiment of the invention, after being unloaded, the stacks of trays are transferred from the unloading means, e.g. the fork, to conveyor track or buffer track, which track at the place of transfer has one or more openings through which the fork is moved downwardly after the transfer of the stack of trays.

As a further embodiment, stacks of trays may be unloaded from two or more separate containers adjacently disposed near the unloading means, and such an unloading means may be in a programmed order from the two or more containers so that different lots of articles may be mixed for further efficient processing, e.g. a mixture of small, medium and large eggs, so that separate small, medium and large eggs subsequent packaging stations are not overloaded at any one time.

As a further feature, the stack carrying shelves may have at least one, but preferably three parallel guide strips, as explained below, to orient the stacks of trays on the shelves. Alternatively, the shelves may have only one central guide strip or one central guide strip with a plurality of transverse short guide ribs extending at right angles to the central guide strip from the sides of the shelf which are parallel to said central guide strip. This latter embodiment has several advantages. First, in removing the stacks of filled trays, there is no need to raise the stacks as high when being moved backwardly in the unloading motion as is required when the shelves have at least three parallel guide strips, but only so high as to be free from the shelves. To ensure correct positioning of the stacks of trays when the stacks are placed on the shelves, the guide strips and short guide ribs, preferably, correspond in shape to the conventional lateral recesses present in a typical egg tray. This embodiment not only makes for faster loading of the stacks on the shelves, but also guarantees proper positioning thereof during unloading. This embodiment, as well as the other embodiments can also be used with loose shelves having a single central guide strip and eventually short transverse guide ribs extending at right angles thereto at the longitudinal edges parallel to the central guide strip.

In order that all stacks of trays may be loaded or unloaded with facility, the lowermost shelf or second lowermost shelf of the container is preferably mounted for rotation to provide an increased amount of space for access to that shelf.

Embodiments of the invention will now be described by way of example, with reference to the accompanying drawings. In said drawings, FIG. 1 shows a perspective of a container unloader for carrying out the method of the invention, omitting a part thereof, namely, the lifting mechanism for the shelves, for clarity purposes;

FIG. 2 shows a side elevational view of the apparatus of FIG. 1, but further showing the lifting mechanism for the shelves which is not shown in FIG. 1;

FIG. 3 shows a diagrammatic top plan view of a part of the apparatus shown in FIGS. 1 and 2;

FIG. 4 shows a front elevational view of the apparatus illustrated in FIG. 3;

FIGS. 5a and 5b show details of two embodiments of the fork-moving means used in the apparatus of FIGS. 1–4;

Figure 6:
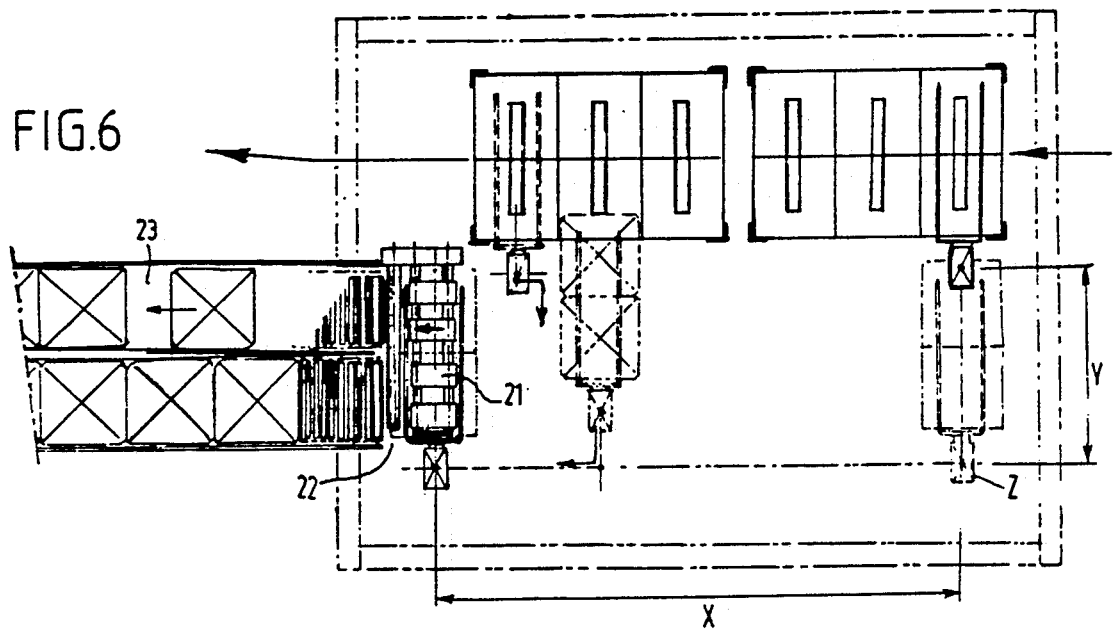
FIG. 6 is a top plan view showing a container unloader and a discharge belt.

Referring to the drawings, there is shown a container unloader substantially consisting of a manipulator 6 (see FIG. 1), having a stack engaging and moving member 7, shown as a fork, which can move in three essentially perpendicular directions, namely the X, Y and Z directions, indicated by the double arrows in FIG. 1. These movements are independent of each other and programmable and controllable by conventional control means (not shown) which operates the three motors $M_x$, $M_y$ and $M_z$.

As further shown in the drawings (FIG. 2), each container essentially consists of four vertical sections 2, which in a preferred embodiment are angle sections, and which by means of connecting sections 3 are interconnected. Supported on the connecting sections 3 are stack carrying shelves 4 which may be permanently attached or removably attached to the container. The angle sections 2 are secured at their lower ends to a bottom section 30 mounted on wheels 31, which allows the container to be moved about a factory floor by means of rails 32, which rails secure the container at a correct position relative to the manipulator 6.

As shown in FIG. 2, the stack carrying shelves 4 are provided at the front portion with a downwardly turned or bent edge 5, usually made of metal. This edge serves to impart rigidity to the shelves, and at the same time prevents the stacks on a subadjacent shelf from being removed from or fall from the container without some positive action by an operator. However, in view of bent edge 5, as will be easily appreciated, in order to remove a stack from the container, the superadjacent shelf, i.e. the shelf located above the stack to be removed, must be lifted, so as to provide a clearance between the edge 5 and the stack to be removed.

The mechanism by which the superadjacent shelf 4 can be lifted consists of two chains 9 (see FIG. 2) and a scanning (or sensing) mechanism (explained in connection with FIGS. 3 and 4). The chains are each disposed at the front of a container and connected to chains 9 is a horizontal beam 10 with electromagnets 11 thereon (see FIGS. 3 and 4). Beam 10 can be moved up and down in guides 17 (see FIG. 3) by means of a drive mechanism 16 operable with chains 9. By moving beam 10 to a position in front of a superadjacent shelf edge, actuating the electromagnets to engage that shelf edge, and moving the beam upwardly, the superadjacent shelf can be lifted and the subadjacent shelf has been unloaded by unloading member 7. The beam will lower the superadjacent shelf to its original positon, release that shelf and be moved away, e.g. to the next shelf to be lifted.

In order to locate a stack of trays and the shelf carrying that stack, use is made of a scanning or sensing mechanism which is fixedly secured to beam 10 (see FIGS. 3 and 4). In this regard, beam 10 is provided with proximity switches 12, 13, 14 and holes 15 for permitting the passage of fork 7. Beam 10 is moved vertically along the container until the proximity switches 12, 13 and 14 detect the underside of a shelf, e.g. shelf 4A in FIG. 4. A reading of the conventional encoders (not shown in the drawings) of the Z-axis determines the position of the underside of shelf 4A. By engaging beam 10 with the fork 7, through holes 15, and moving the fork slightly upwardly, the beam is positioned opposite the shelf edge. The beam 10 is then moved to the left and the right adjacent a shelf edge, and the container width and any container misalignment are sensed and measured on the X-axis by means of the sensing proximity switches 12, 13 and encoders (not shown). By moving beam 10 further upwards, the upper edge of shelf 4A can be found in the same manner by switches 12, 13 and 14. If the above procedure is repeated for all shelves, the edges of the shelves and the pitches of the shelves (distances between shelves) are all approximately known and remembered by the control means. Subsequently, the fork 7 or the drive mechanism 16 will move beam 10 to a position intermediate of shelves (a "rest" position). The beam will remain in the rest position until a superadjacent shelf has been unloaded, as described below, and that shelf is to be lifted for unloading a subadjacent shelf, also as described below.

By means of the above-described "coarsely"-determined position of a shelf edge, e.g. the bent edge 5 of the shelf 4A, the apparatus can now find the precise top of a desired shelf, e.g. shelf 4B, by positioning fork 7 at the predetermined position below the edge of shelf 4B and then, by moving fork 7 slowly upwardly, accurately determining the position of the top of shelf 4B by means of a sensor or sensors in fork 7 (see FIG. 5), which will be described in more detail hereinafter. By means of the shelf pitch, i.e. the perpendicular distance between the shelves, thus coarsely determined, and the accurate position of the top of shelf 4B being determined, the position of the next above shelf 4A can be approximated and remember by the control means.

Figure 7:
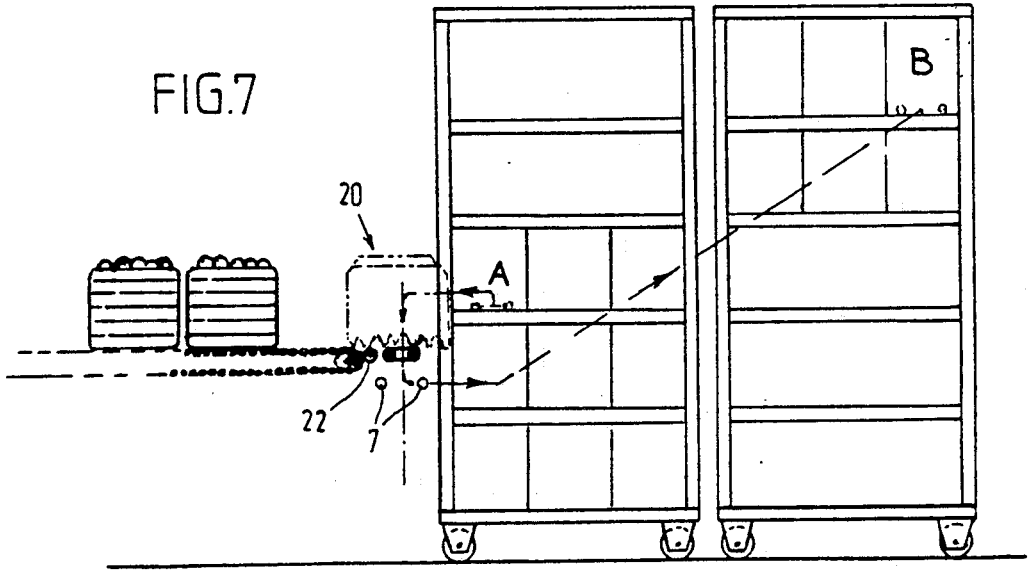
FIG. 7 shows a front elevational view of the apparatus shown in FIG. 6.

Referring now to FIGS. 6 and 7, there is shown a deposition station 20. Arranged in this station are a set of continuously travelling conveyor belts 21, with one or two slots 22 between them, through which the fork 7 can be lowered to deposit a stack of trays on the belts.

Immediately after being deposited, the stacks of trays are removed by the belts from the deposition station to a discharge or buffer conveyor 23 to clear the deposition station for a next stack of trays.

Turning now to the detailed operation of fork 7, the stacks of trays are slightly lifted from a shelf by means of fork 7, i.e. fork 7 is inserted into conventional tunnel-shaped openings 25 of the lowermost tray of the stack of trays (see FIG. 4), and the stack is slightly lifted for easy removal from the shelf and for clearance from guide strips 8 (see FIG. 3), as described more fully below. As noted hereinbefore, the operation of beam 10 provides an approximate position of the shelf to be unloaded. The fork must then determine the exact position of the upper or top edge of that shelf so that the fork can be accurately placed in openings 25. For this purpose the ends of the fork 7 are provided with a sensor or switch element 26, which is actuated when element 26 touches something. This switch element may be a proximity switch in the end face of the fork (as shown in FIG. 5a) or a spring-urged pin 27 which, when touched by a shelf, is moved against the action of a spring 28 and actuates switch 26 (as shown in FIG. 5b).

Beam 10 will have determined a coarse position of the shelf edge, as explained above, and fork 7 will be set at that course position but slightly lower than the upper edge of the shelf. When the fork 7 is moved in the direction of the shelf edge 5, the fork ends contact the front of the edge of the shelf and thus detect the shelf by means or sensor 26 or pins 27. In view of the width (height) of the bent edge 5 of the shelf, this positioning of the fork need not be too accurate. Thereafter, the fork is moved upwardly (vertically in the Z-direction) until the shelf edge is no longer detected. The fork is now just above the shelf edge. The fork is then moved in the direction of the stack (in the Z-direction) and thus comes to lie underneath the stacks of trays and in openings 25. The stacks are subsequently slightly lifted so as to clear the guide strip or strips 8 (see FIG. 3) on the shelves. When it is the middle stack which is to be removed, a to-and-fro lateral movement of the fork is made to push the adjacent outer stacks of trays gently aside, so the middle stack can be taken from the shelf and out of the container without interference from the other adjacent outer stacks of trays of the three adjacent stacks of trays. When the outer stacks of trays are to be removed, each stack is moved toward the middle of the shelf to avoid interference with the angle sections 2.

The fork 7, carrying a stack of trays, is then moved horizontally backwards to move the stack of trays out of the container and to the deposition station 20 (see FIG. 7) or is moved to a "rest" position, if necessary, to await the deposition station 20 being cleared. If the deposition station is cleared, the fork will go directly to the deposition station.

When the stack has been placed on the deposition station, the fork will be moved downwards from slots 22 in a continuous movement and thence by the shortest route to a next stack of trays in the container.

The above describes the operation of the various elements of the invention, and the following will describe the cooperation of those elements. One or more containers 1 are wheeled in tracks 32 to the manipulator 6 and positioned opposite fork 7 (see FIG. 1). Of course, container 1 may be wheeled to such positions by automatic motive means, as is common in modern factories. Drive mechanism 16 is actuated to move beam 10 until proximity switches 12, 13 and 14 detect a shelf, e.g. shelf 4A in FIG. 4. By moving beam 10 vertically in guides 17, proximity switches 12, 13 and 14 will detect the presence and pitch of each shelf (distance between shelves), as explained above and further discussed below. With this "coarsely"-determined position of each shelf edge, a shelf for unloading of the stacks of trays may be selected. If each shelf of the container is loaded with stacks of trays, then the uppermost shelf of the container will be selected for first unloading.

More specifically, after beam 10 is moved to a shelf, and that shelf is detected by proximity switches 12, 13 and 14, fork 7 is moved into holes 15, and beam 10 is moved laterally, to-and-fro, in guides 17 so that proximity switches 12 and 13 can determine the width of the shelves and any misalignment (see FIG. 3). The center of the shelf will also be determined in this movement of beam 10, so that fork 7 is positioned in the center of the middle stack of trays on the shelf. The fork 7 is then slightly retracted and beam 10 is moved to a rest position, i.e. a position away from the shelf being unloaded. These movements are, of course, controlled by conventional control means (not shown), e.g. a computer and the like.

At this point, fork 7 is in a position to determine the top of a next shelf to be unloaded, and the control means controls the movement of the fork (the unloading means), such that the fork is movable vertically adjacent the shelf edge so as to place the fork at the top of the shelf to be unloaded. This is achieved by sensors 26 (see FIG. 5) in fork 7. As explained above, these sensors contact the bent edge 5 (see FIG. 2) of the shelf to be unloaded, and when that contact is determined, the fork is moved slowly upwardly, until the sensors 26 no longer detect the shelf edge. Therefore, the fork is just at the top of the first shelf to be unloaded.

The control means then moves the fork horizontally forward so as to insert the fork ends under the lowermost tray of the middle stack of trays, i.e. openings 25 (see FIG. 4) and then elevate the fork slightly, i.e. that the stack of trays clears guide strip 8, see FIG. 3. The control means then laterally moves the fork, i.e. to-and-fro, to loosen the middle stack of trays from the adjacent stacks of trays so that the middle stack of trays is removable without interference from the other stacks of trays of the three adjacent stacks of trays (see FIG. 4).

There may be a guide strip 8 in each of the three adjacent stacks of trays, for correct positioning thereof, but as described hereinafter, only one such guide strip 8, as shown in FIG. 3, is necessary.

The control means then moves the fork horizontally backwards, i.e. away from the container, to remove the middle stack of trays from the container. The removed stack of trays is then moved to the deposition station 20 (see FIG. 7), as described above.

Thereafter, the fork is moved back to that shelf and positioned in front of one of the other stacks of trays on the shelf. After the fork is positioned under that stack of trays, the stack of trays is moved by the fork slightly inwardly to clear angle sections 2 (see FIG. 3) and then removed from the shelf and taken to the deposition station, in the same manner as described above. The remaining stacks of trays are likewise removed from the shelf.

FIG. 3 illustrates an alternate embodiment to that of the above described operation. As can be seen from FIG. 3, only one guide strip 8 is used for accurately positioning the middle stack of trays on the shelf. In this arrangement, instead of having three parallel guide strips 8, i.e. one for each set of stacks of trays, there is only one central guide strip 8, i.e. for the middle stack of trays, and transverse short guide ribs 8A for positioning the outer stacks of trays (see FIG. 3). These guide ribs extend at right angles to the central guide strip 8 and extend from the sides of the shelf which are parallel to the central guide strip 8, as shown in FIG. 3. These transverse short guide ribs will fit within conventional openings in the lowermost tray of a stack of trays, which conventional openings are similar to those shown as 25 in FIG. 4.

With this arrangement, there is no need for raising the stack of trays as high as described above in connection with unloading stacks of trays where there are three parallel guide strips 8. The outer stacks of trays only need be raised high enough to clear shelf 4, as the short ribs 8A are in the direction of the first stack movement, while at the same time, the short ribs 8A will ensure correct positioning of the stacks of trays when the stacks are placed on the shelves. As shown by the arrows in FIG. 3, fork 7 will remove the outer stack of trays by moving laterally inwardly so as to position an outer stack of trays such that it clears angle section 2 and short ribs 8A, and then simply remove the stack of trays by horizontally moving the fork with the stack of trays backwardly out of the container. The stack of trays may also be loaded onto the shelf, as shown by the arrows in FIG. 3 by moving the stack of trays into the shelf and positioning the stack of trays on a short guide rib 8A.

Figure 8:
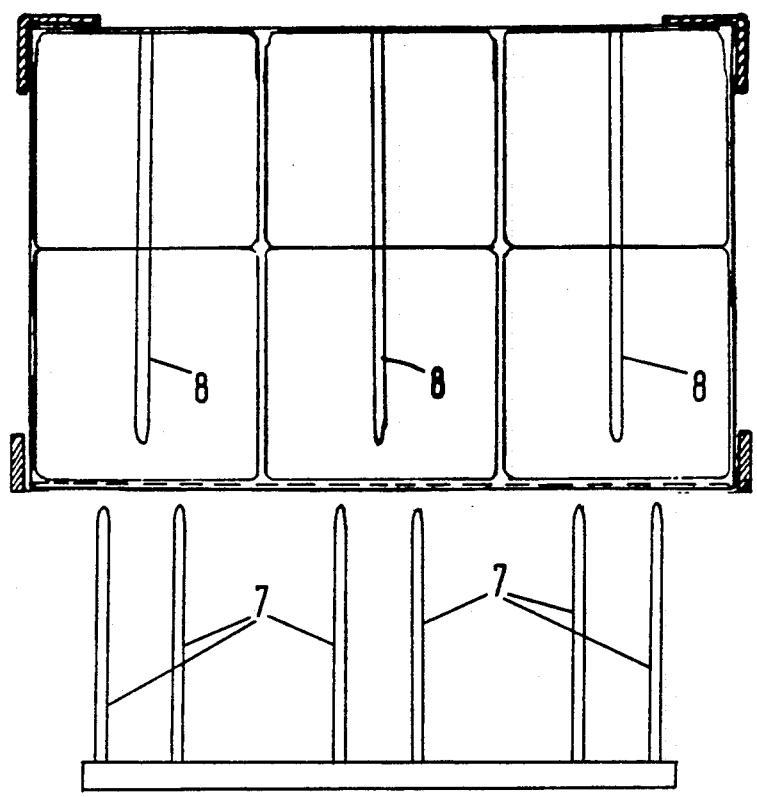
FIG. 8 shows an alternative embodiment where three stacks of trays are simultaneously unloaded.

FIG. 8 shows a further alternate embodiment, where the three adjacent stacks of trays are simultaneously unloaded. In comparing FIGS. 3 and 8, it will be noted that angle section 2 (see FIG. 3) has been modified so that it is no longer in angular shape in FIG. 8, so that the stacks of trays may be simultaneously unloaded by inserting the series of forks 7 thereunder and laterally and backwardly removing all stacks of trays from the shelf in one operation. This arrangement, however, does have a disadvantage in that the stacks of trays are not as securely contained in the container as when the angle section 2 (see FIG. 3) is used.

As noted above, manipulator 6 can accommodate and unload two or more containers, alternately, in accordance with a predetermined program. This is shown by way of example in FIG. 7, in which stacks have been removed from the position designated by A in the left-hand container, and deposited on deposition station 20, whereafter the fork 7 moves from below the deposition station to position B of the right-hand container to remove a stack of trays. There is thus created the ability of mixing lots of different articles, e.g. lots of small, medium and large eggs, which is often desirable with sorting and packing plants, because eggs from a given farm will often fall in the same size class, which will result in overloading of this class during further processing, e.g. packaging. By mixing eggs from different farms, which belong to different classes, the sorting and packaging equipment can be uniformly loaded for efficient operation thereof.

Normally a container has on each shelf 6 stacks, i.e. three in front and three behind the first stacks, i.e. that there are always two stacks behind each other on very two fork prongs.

It will be clear that a number of modifications are possible within the scope of the inventive concept. Furthermore, it will be understood that it is possible to use the apparatus described herein for loading trays into a container. The modifications are intended to be embraced by the spirit and scope of the annexed claims.

What I claim is:

1. Apparatus for unloading stacks of trays from a movable storage container, comprising:
   (1) a storage container having vertically-disposed supports and a plurality of horizontally-disposed sections connecting said supports and forming a plurality of horizontally-disposed shelves which are positioned at different vertical levels of said container for holding on each shelf at least three laterally adjacent stacks of trays, each shelf having a front side and a back side and a centrally located guide strip extending from near the back side to near the front side with the guide strip being substantially parallel to the other two sides of the shelf and having short guide ribs extending from the said other two sides at right angles thereto;
   (2) unloading means for unloading a stack of trays from said container and having a configuration such that the unloading means is capable of being inserted under a lowermost tray of the middle stack of said trays of said three adjacent stacks of trays and supporting that middle stack of trays;
   (3) unloading moving means for moving said unloading means; and
   (4) control means for controlling the movement of the unloading means such that the unloading means is movable:
      (a) vertically adjacent said container such as to place said unloading means at the top of a first shelf to be unloaded;
      (b) horizontally forward such as to insert said unloading means under said lowermost tray of said middle stack of trays;
      (c) vertically to slightly elevate the stack of trays from the shelf;
      (d) laterally such as to loosen said middle stack of trays from said adjacent stacks so that the middle stack of trays is removable without interference from the other stacks of trays of the said three adjacent stacks of trays; and
      (e) horizontally backwards such as to remove said middle stack of trays from said container.

2. The apparatus of claim 1 wherein each shelf is provided at the front side thereof with a downwardly bent edge, whereby stacks of trays on the next under shelf are prevented from being removed from the container while said edge is so positioned and wherein the apparatus has shelf lifting means for lifting a next above shelf upwardly to provide a clearance between the said edge and the top of the underlying stacks.

3. The apparatus of claim 2 wherein the shelf lifting means is movable vertically adjacent said container and the lifting means is contactable with the said next above shelf for lifting the next above shelf to provide said clearance.

4. The apparatus of claim 3 wherein said lifting means is laterally movable and the lifting means has detecting means disposed near each end thereof whereby the width of the said container is determined by moving said lifting means laterally and detecting the ends of the said container.

5. The apparatus of claim 4 wherein the unloading means is engageable with said lifting means and said unloading means is movable laterally for moving said lifting means laterally and detecting the width of the container.

6. The apparatus of claim 4 wherein the said detecting means are proximity switches disposed near each end of the lifting means.

7. The apparatus of claim 3 wherein the said lifting means has electromagnets and the said lifting means is contactable with said edge, made of metal, of the said next above shelf by actuating said electromagnets.

8. The apparatus of claim 5 wherein the unloading means has fork-shaped elements with at least two forks, the lifting means is in the form of a beam with apertures for receiving the said forks and said beam is movable by moving the fork-shaped element of the unloading means.

9. The apparatus of claim 1 wherein the unloading means has fork-shaped elements having at least two forks and at least the lowermost tray of said middle stack has tunnel-shaped openings in a lower portion thereof, and said fork-shaped element is movable into said openings for moving and removing said middle stack.

10. The apparatus of claim 9 wherein the ends of the forks have sensing means and the fork-shaped element is slowly vertically movable along the said edge of the shelf until the sensing means determines that the ends of the forks have cleared the upper edge of the shelf and are thus positioned for inserting under the said lowermost tray.

11. The apparatus of claim 1 wherein the unloading moving means is also capable of moving said unloading means such as to remove the middle stack to a buffer track for receiving the said stack.

12. The apparatus of claim 1 wherein the said shelf is comprised of a support shelf and a removable tray carrying shelf for disposition of the support shelf, and the tray carrying shelf has disposed thereon the said centrally located guide strip and the said short guide ribs.

* * * * *